United States Patent Office 3,168,566
Patented Feb. 2, 1965

3,168,566
PROCESS FOR RACEMIZING α-PHENYL AND
α-NAPHTHYL ETHYLAMINES
Ira Lofer, East Paterson, N.J., and Morris Dunkel, Kew
Gardens, and Howard C. Klein, Brooklyn, N.Y., assignors to Nopco Chemical Company, Newark, N.J., a corporation of New Jersey
No Drawing. Filed Sept. 1, 1961, Ser. No. 135,439
9 Claims. (Cl. 260—570.8)

The present invention relates to a process for the racemization of optical isomers. More particularly, this invention relates to the racemization of the optical isomers of α-phenylethylamine, α-(α-naphthyl)-ethylamine and α-(β-naphthyl)-ethylamine.

The levorotatory isomer of α-phenylethylamine is useful as a resolving agent for amino acids and racemic α-hydroxy-β,β-dimethyl-γ-butyrolactone while the dextrorotatory isomers of α-(α-naphthyl)-ethylamine and α-(β-naphthyl)-ethylamine are usful resolving agents in the production of 1-menthol from racemic menthol. However, extreme difficulties have been encountered in attempts to racemise the optical isomers of the above materials. The art is fairly well developd with regard to the racemization of optical isomers which contain activated hydrogen atoms in the alpha position, i.e., an enolizable hydrogen atom attached to a carbon atom which is alpha to a C=O group such as is found in aldehydes, ketones, acids and esters. These materials have been racemized by sodium hydroxide, alkali metal silicates and even by heat alone. However, the amines with which the present invention is concerned present greater difficulties regarding their racemization because they do not contain an active hyydrogen atom attached to a carbon which is alpha to any of the aforesaid groups. In Patent No. 2,963,512, Bottoms, December 6, 1960, the difficulties of racemizing α-(naphthyl)-ethylamines are set forth. For example, an optically active α-(naphthyl)-ethylamine was treated with boiling 30% sodium hydroxide solution for 8 to 12 hours without any significant racemization. This same patent offers a multi-step procedure for racemizing α-(naphthyl)-ethylamines by treating the amine with nitrous acid, oxidizing the resulting alcohol with hexavalent chromium to a ketone and finally subjecting the ketone to reductive amination. Even bases such as aluminum isopropylate and sodium methoxide which have been used to racemize menthol have little effect on the racemization of these amines. Thus, it can be seen that the art still has not come up with any straightforward, efficient method for racemizing these amines.

Accordingly, it is an object of the present invention to provide for a process for racemizing optical isomers which do not contain an active hydrogen in the alpha position.

Another object of this invention is to provide for a process which is straightforward, efficient, and improved when compared to prior art processes for racemizing optical isomers which do not contain an active hydrogen in the alpha position.

It is a further object to provide for an improved process for racemizing optical isomers of α-phenylethylamine, α-(α-naphthyl)-ethylamine and α-(β-naphthyl)-ethylamine to their respective racemic mixtures.

A still further object of this invention is to provide for an improved process for racemizing d-α-phenylethylamine to racemic α-phenylethylamine and to racemize l-α-(α-naphthyl)-ethylamine and l-α-(β-naphthyl)-ethylamine to their respective racemic mixtures.

Further object will become apparent from the detailed description given hereinafter. It is intended, however, that the detailed description and examples do not limit this invention, but merely indicate the preferred embodiments since various changes and modifications within the scope of the invention will become apparent to those skilled in the art.

We have unexpectedly discovered that the above as well as other objects can be successfully achieved in the following manner. We have discovered that alkali metals such as sodium, potassium and lithium are outstanding catalysts for the racemization of optical isomers of α-phenylethylamine, α-(α-naphthyl)-ethylamine and α-(β-naphthyl)-ethylamine. Furthermore, we have found sodium to be the preferred catalyst since it affords a greater degree of racemizaiton in the shortest period of time when compared with our other catalysts.

When carrying out our racemization process, the optical isomer, which can be either the d- or the l-isomer of the aforesaid amines, is admixed with the catalyst and heated at elevated temperatures for a period of time sufficient to effect the desired degree of racemization. The racemization is preferably performed in an inert atmosphere, such as nitrogen or vapors of the amine itself. Optionally, a solvent which is inert with respect to the catalyst and the material to be racemized can be used. Examples of useful solvents are the following: tetrahydrofuran, dioxane, diethyl Cellosolve, xylene, anisole, methyl tolylether, cymene and decalin.

It has been found that the ratio of catalyst to optical isomer can be varied over a wide range. For efficient and practical commercial use, the catalyst should be used in the proportions of from about 0.05% to about 20% based on the weight of the optical isomer. Preferably, the amount of catalyst should be from about 0.02% to 1.0% by weight of the optical isomer.

The temperature can be varied over a wide range, any temperature between the melting point, if a solid, or 60° C. and the boiling point of the optical isomer serving to effect the desired racemization. When a solvent is used, the temperature can vary from 60° C. up to the reflux temperature of the system. Likewise, the time of treatment can be varied over a considerable range depending on the temperature used and the degree of racemization desired. Generally, the treatment is carried out over a period of from about 10 minutes to about 100 hours.

The relationship between the conditions of time, temperature, and concentration can be set forth as follows. At any given temperature and given time, the rate of racemization is dependent upon the concentration of the catalyst and can be accelerated by increasing the catalyst concentration. At any given catalyst concentration and given time, the rate of racemization is dependent upon the temperature which is used and can be accelerated by increasing the temperature. At any given catalyst concentration and given temperature, the extent of the racemization is dependent upon the time and can be increased by extending the period of time over which heating is carried out. In brief, the rate of racemization is dependent upon catalyst concentration and temperature while the extent of racemization is dependent upon time of heating.

After racemization is complete, the racemic mixture of d- and l-isomers can be readily resolved by any of the well-known resolution procedures. Thus, for example, the racemic mixture of α-phenylethylamine can be resolved by making use of tartaric acid and malic acid as described in Organic Syntheses, volume II, pages 506–509 (1943). It should be understood that the present invention is in no manner limited to resolution procedures for separating and recovering the optical isomers.

It should also be understood that both the d- and l-optical isomers of each of the foregoing amines can be racemized by the procedures described herein, although, from a commercial standpoint, this invention is of particular value with regard to the racemization of d-α-phenylethylamine, l-α-(α-naphthyl)-ethylamine and l-α-(β-naphthyl)-ethylamine.

As the foregoing has demonstrated, a new and improved racemization procedure has been found which is admirably adapted to the racemization of optical isomers of particular amines which do not contain an active hydrogen in the alpha position.

For a fuller understanding of the nature and objects of this invention, reference may be made to the following examples which are given merely to illustrate the invention and are not to be construed in a limiting sense.

*Example I*

20.0 grams of d-α-phenylethylamine having $$[\alpha]_D^{25} = +42.3$$

was added to a reflux apparatus along with 44 mgs. of freshly cut sodium. Refluxing (at 188° C.) without stirring was carried out for 20 minutes. At this point the amine turned deep purple in color. At the conclusion of the refluxing, the amine was distilled at 47° C. under 4 mm. pressure. The optical rotation of the resulting refluxed material was determined and found to be zero. This indicated complete racemization of d-α-phenylethylamine to racemic α-phenylethylamine. The amine was almost quantitatively recovered with respect to the amount of starting d-α-phenylethylamine.

*Example II*

To a sample of d-α-phenylethylamine having an observed rotation of +46.1 was added sodium (pea size). Heating at 94° C. for one hour was carried out. At this time, the optical rotation of the amine decreased to +45.1. After a total of 43 hours of heating at 90° C., the rotation was +32.7.

*Example III*

Twenty-five grams of d-α-phenylethylamine was refluxed with 60 mg. of potassium for two and one-half hours. The optical rotation decreased from +34.5 to +10.0.

*Example IV*

This example shows the relative ineffectiveness of two known racemization catalysts as well as heat alone on the racemization of d-α-phenylethylamine.

A. A sample of d-α-phenylethylamine was heated for six hours at steam bath temperature in the presence of aluminum isopropylate. A decrease of 3.2 degrees in optical rotation was found.

B. When a similar racemization was carried out at 180° C. for 5.5 hours with aluminum isopropylate, a similar change in rotation was observed.

C. A sample of d-α-phenylethylamine was refluxed for one hour with sodium methylate. The optical rotation of the amine was found to have decreased from +42.3 to +40.5.

D. A sample of d-α-phenylethylamine was refluxed for one hour in the absence of a catalyst. The optical rotation of the amine was found to be unchanged.

In all of the preceding examples, an inert atmosphere of nitrogen was maintained during the carrying out of the process.

Having described our invention, what we claim to be new and wish to secure by Letters Patent is:

1. A process for the racemization of an optical isomer selected from the group consisting of d-α-phenylethylamine
    l-α-phenylethylamine
    d-α-(α-naphthyl)-ethylamine
    l-α-(α-naphthyl)-ethylamine
    d-α-(β-naphthyl)-ethylamine
    l-α-(β-naphthyl)-ethylamine which comprises heating said optical isomer with an alkali metal as a racemization catalyst in an inert atmosphere at temperatures between 60° C. and the boiling point of said optical isomer with the proviso that when said optical isomer is a solid, said optical isomer is heated at temperatures between the melting point and boiling point of said optical isomer, said heating being carried out for a period of from about 10 minutes to about 100 hours, said alkali metal being present in amounts sufficient to racemize said optical isomer.

2. The process of claim 1 in which said isomer is heated in the presence of an inert solvent at temperatures of from about 60° C. up to the reflux temperature of the system.

3. The process of claim 1 in which there is present from about 0.05% to about 20% of catalyst based upon the weight of said isomer.

4. The process of claim 1 in which said alkali metal is sodium.

5. A process for racemizing d-α-phenylethylamine which comprises heating said isomer with an alkali metal as a racemization catalyst in an inert atmosphere at temperatures between 60° C. and the boiling point of said optical isomer, said heating being carried out for a period of from about 10 minutes to about 100 hours, said alkali metal being present in amounts sufficient to racemize said optical isomer.

6. The process of claim 5 in which said d-α-phenylethylamine is heated in the presence of an inert solvent at temperatures of from about 60° C. up to the reflux temperature of the system.

7. The process of claim 5 in which there is present from about 0.05% to about 20% by weight of catalyst based upon the weight of said d-α-phenylethylamine.

8. The process of claim 5 in which said alkali metal is sodium.

9. The process of claim 5 in which said alkali metal is potassium.

References Cited in the file of this patent

UNITED STATES PATENTS 2,608,583     Aschner _____ Aug. 26, 1952

OTHER REFERENCES

Berkman et al.: "Catalysis," pages 839, 852 and 855 (1940).

Cusmano: "Gazz. Chim. Ital.," vol. 60, pages 105–12 (1930).